US012785298B2

(12) United States Patent
Kobayashi et al.

(10) Patent No.: US 12,785,298 B2
(45) Date of Patent: Nov. 3, 2026

(54) TERMINAL, TERMINAL-EQUIPPED ELECTRIC WIRE, AND CONNECTION STRUCTURE

(71) Applicants: SUMITOMO ELECTRIC INDUSTRIES, LTD., Osaka (JP); Sumitomo Wiring Systems, Ltd., Yokkaichi (JP); AutoNetworks Technologies, Ltd., Yokkaichi (JP)

(72) Inventors: Ryohei Kobayashi, Osaka (JP); Toru Maeda, Osaka (JP); Kenji Miyamoto, Osaka (JP); Masashi Fujiki, Yokkaichi (JP); Akihiro Hayashi, Yokkaichi (JP)

(73) Assignees: SUMITOMO ELECTRIC INDUSTRIES, LTD., Osaka (JP); Sumitomo Wiring Systems, Ltd., Yokkaichi (JP); AutoNetworks Technologies, Ltd., Yokkaichi (JP)

( * ) Notice: Subject to any disclaimer, the term of this patent is extended or adjusted under 35 U.S.C. 154(b) by 356 days.

(21) Appl. No.: 18/690,498

(22) PCT Filed: Mar. 14, 2023

(86) PCT No.: PCT/JP2023/009943
§ 371 (c)(1),
(2) Date: Mar. 8, 2024

(87) PCT Pub. No.: WO2023/238470
PCT Pub. Date: Dec. 14, 2023

(65) Prior Publication Data

US 2024/0380133 A1 Nov. 14, 2024

(30) Foreign Application Priority Data

Jun. 7, 2022 (JP) ................................ 2022-092361

(51) Int. Cl.
*H01R 4/34* (2006.01)
*H01R 4/30* (2006.01)
*H01R 4/62* (2006.01)

(52) U.S. Cl.
CPC ............... *H01R 4/34* (2013.01); *H01R 4/302* (2013.01); *H01R 4/62* (2013.01)

(58) Field of Classification Search
CPC ............. H01R 4/34; H01R 4/302; H01R 4/62
(Continued)

(56) References Cited

U.S. PATENT DOCUMENTS 5,931,695 A * 8/1999 Scully ................. H01R 13/746 439/550
11,034,135 B2 * 6/2021 Oh ......................... B32B 37/12
(Continued)

FOREIGN PATENT DOCUMENTS

JP 52-009780 U 1/1997
JP 2002202213 A * 7/2002 ............... G01L 5/00
(Continued)

*Primary Examiner* — Gary F Paumen
(74) *Attorney, Agent, or Firm* — Volpe Koenig

(57) ABSTRACT

A terminal is constructed to be connected to an attachment target by a bolt, and includes a first surface, a through hole, and an asperity portion. A material for the terminal is aluminum, etc. The terminal has a Vickers hardness equal to or higher than 80 HV. A ratio S1/S2 between a first area S1 and a second area S2 while the first surface and the attachment target are connected to each other by tightening of the bolt is equal to or lower than 0.8. The first area S1 is an area of a region where the first surface is in contact with the attachment target at a pressure equal to or higher than 25 MPa. The second area S2 is an area of an annular region around the bolt. The first area S1 is equal to or larger than 5 $mm^2$.

15 Claims, 7 Drawing Sheets

(58) Field of Classification Search
USPC .................................................. 439/801, 886
See application file for complete search history.

(56) References Cited

U.S. PATENT DOCUMENTS

| | | | | |
|---|---|---|---|---|
| 2015/0236439 | A1* | 8/2015 | Okubo | C25D 5/10 439/886 |
| 2015/0295333 | A1* | 10/2015 | Shibuya | C25D 5/611 428/647 |
| 2015/0333416 | A1* | 11/2015 | Kihara | H01R 4/20 439/877 |
| 2016/0099507 | A1* | 4/2016 | Tachibana | B23K 26/21 219/121.64 |
| 2018/0026381 | A1* | 1/2018 | Haraguchi | H01R 25/165 439/76.2 |

FOREIGN PATENT DOCUMENTS

| | | | |
|---|---|---|---|
| JP | 2003-317817 | A | 11/2003 |
| JP | 2022-011128 | A | 1/2022 |
| JP | 2022-022609 | A | 2/2022 |
| JP | 2023-015870 | A | 2/2023 |
| WO | 2017/104366 | A1 | 6/2017 |

* cited by examiner

TERMINAL, TERMINAL-EQUIPPED ELECTRIC WIRE, AND CONNECTION STRUCTURE

TECHNICAL FIELD

The present disclosure relates to a terminal, a terminal-equipped electric wire, and a connection structure.

The present application claims priority to Japanese Patent Application No. 2022-092361 filed on Jun. 7, 2022, the entire contents of which are hereby incorporated by reference.

BACKGROUND ART

PTL 1 and PTL 2 disclose a terminal-equipped electric wire connected to an attachment target by a bolt. The terminal is provided with a through hole. The bolt that connects the terminal and the attachment target to each other passes through the through hole. As the terminal and the attachment target are tightened by the bolt and a nut, the terminal and the attachment target are mechanically fixed to each other and electrically conduct to each other.

The terminal provided in the terminal-equipped electric wire is composed, for example, of aluminum or an aluminum alloy. Aluminum or the aluminum alloy is light in weight, which contributes to reduction in weight of the terminal and the terminal-equipped electric wire.

CITATION LIST

Patent Literature

PTL 1: Japanese Patent Laying-Open No. 2022-11128
PTL 2: Japanese Patent Laying-Open No. 2022-22609

SUMMARY OF INVENTION

A terminal in the present disclosure is constructed to be connected to an attachment target by a bolt, the terminal including

- a first surface that faces the attachment target while the first surface is connected to the attachment target, and
- a through hole through which the bolt passes. In the terminal,
- the first surface is provided with an asperity portion formed around the through hole,
- a material for the terminal is aluminum or an aluminum alloy,
- the terminal has a Vickers hardness equal to or higher than 80 HV,
- a ratio S1/S2 between a first area S1 and a second area S2 while the first surface and the attachment target are connected to each other by tightening of the bolt is equal to or lower than 0.8,
- the first area S1 is an area of a region where the first surface is in contact with the attachment target at a pressure equal to or higher than 25 MPa,
- the second area S2 is an area of an annular region having an inner diameter defined by a nominal diameter D2 of the bolt determined based on an inner diameter D1 of the through hole and an outer diameter defined by a flange diameter D3 of the bolt, and
- the first area S1 is equal to or larger than 5 $mm^2$.

DETAILED DESCRIPTION

Figure 1:
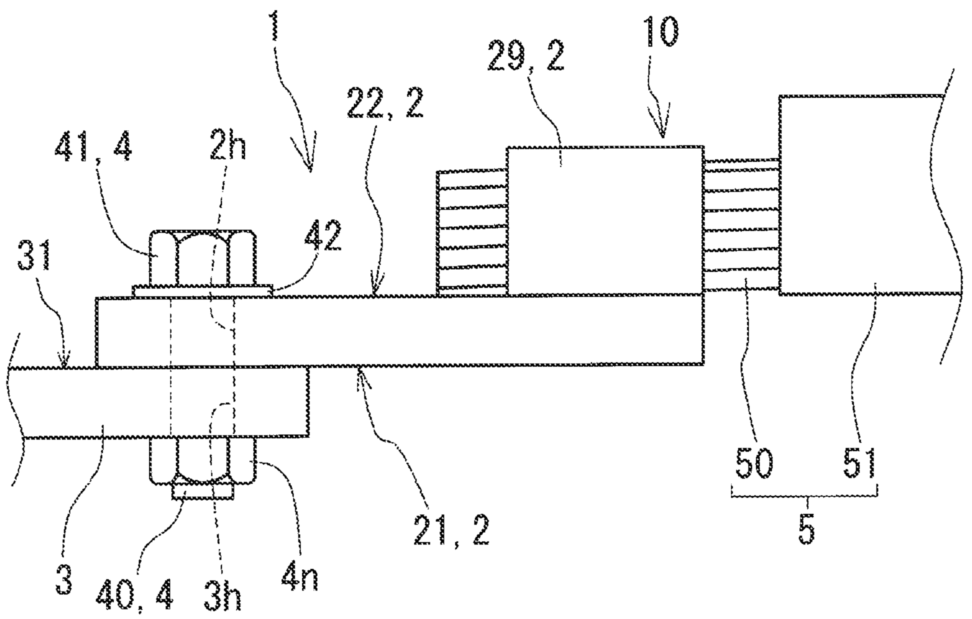
FIG. 1 is a schematic side view of a connection structure according to a first embodiment.

Problem to be Solved by the Present Disclosure

In a connection structure obtained by connection between a terminal and an attachment target, a contact resistance at an interface between the terminal and the attachment target may increase over time. For example, when vibration and thermal shock are applied to the connection structure, tightening of the terminal and the attachment target is loosened or the terminal and the attachment target rub against each other at the interface. In particular, when the terminal and the attachment target are made of materials different in type from each other, thermal shock tends to be applied to the interface due to a difference in coefficient of thermal expansion between the terminal and the attachment target. A fresh surface of aluminum is formed on a surface of the terminal at the interface due to friction or the like. Oxidation of the fresh surface of aluminum increases the contact resistance between the terminal and the attachment target.

One of objects of the present disclosure is to provide a terminal capable of achieving suppression of increase in contact resistance over time at an interface between the terminal and an attachment target.

Advantageous Effect of the Present Disclosure

The terminal in the present disclosure can achieve suppression of increase in contact resistance over time at the interface between the terminal and the attachment target.

Description of Embodiments of the Present Disclosure

Embodiments of the present disclosure will be listed and described below.

<1> A terminal according to the embodiment is constructed to be connected to an attachment target by a bolt, the terminal including

- a first surface that faces the attachment target while the first surface is connected to the attachment target, and
- a through hole through which the bolt passes. In the terminal,
- the first surface is provided with an asperity portion formed around the through hole,
- a material for the terminal is aluminum or an aluminum alloy,
- the terminal has a Vickers hardness equal to or higher than 80 HV,
- a ratio S1/S2 between a first area S1 and a second area S2 while the first surface and the attachment target are connected to each other by tightening of the bolt is equal to or lower than 0.8, the first area S1 is an area of a region where the first surface is in contact with the attachment target at a pressure equal to or higher than 25 MPa, the second area S2 is an area of an annular region having an inner diameter defined by a nominal diameter D2 of the bolt determined based on an inner diameter D1 of the through hole and an outer diameter defined by a flange diameter D3 of the bolt, and the first area S1 is equal to or larger than 5 $mm^2$.

The terminal according to the embodiment is not limited to a terminal in a form connected to an electric wire. The terminal in the present disclosure may be, for example, a part of a bus bar, that is, a connection portion formed in the bus bar. The connection portion is such a portion that a part of the bus bar is formed in a shape of a terminal. In addition, the terminal in the present disclosure may be, for example, a part of a single-core wire, that is, a connection portion formed at a tip end of the single-core wire.

The terminal has the Vickers hardness equal to or higher than 80 HV. A projection of the asperity portion of the terminal having such a hardness tends to be engaged in the attachment target when the terminal and the attachment target are connected to each other by the bolt. The projection engaged in the attachment target is deformed by the attachment target. As the projection is deformed, an oxide coating in the vicinity of the projection is broken and the terminal and the attachment target electrically conduct to each other. As the projection is engaged in the attachment target and the projection is deformed, the terminal and the attachment target are mechanically securely fixed to each other. The projection having the Vickers hardness equal to or higher than 80 HV is less likely to be deformed by thermal shock and vibration after the terminal and the attachment target are connected to each other. Therefore, strength of connection between the terminal and the attachment target is less likely to be lowered by thermal shock and vibration. In other words, tightening of the terminal and the attachment target is less likely to be loosened, or the terminal and the attachment target are less likely to rub against each other at the interface between the terminal and the attachment target. Consequently, formation of the fresh surface of aluminum on the surface of the terminal at the interface due to friction or the like is less likely, and increase in contact resistance between the terminal and the attachment target is less likely.

First area S1 is an area of a region where the first surface is in contact with the attachment target at a pressure equal to or higher than a defined value. With axial force of the bolt being constant, as a ratio of first area S1 to second area S2 is lower, a pressure applied to the region having first area S1 increases. When an absolute value of first area S1 is too small, however, strength of connection between the terminal and the attachment target is not sufficiently secured. When ratio S1/S2 is equal to or lower than 0.8 and first area S1 is equal to or larger than 5 $mm^2$, the terminal and the attachment target are mechanically securely connected to each other and strength of connection therebetween tends to be maintained for a long time. Consequently, the contact resistance between the terminal and the attachment target is less likely to increase over time.

<2> In the terminal described in <1> above, the first area S1 may be an area of a specific color exhibiting region of a pressure-sensitive sheet obtained in a tightening test that satisfies conditions below.

In the tightening test, a multilayer body in which the pressure-sensitive sheet is arranged between the first surface and a tough pitch copper plate may be tightened with axial force of $138\times(D\mathbf{2})^2\pm50$ N, the tough pitch copper plate may be an annular plate having a thickness of 1.5 mm and the Vickers hardness of 78±5 HV, the annular plate may have an inner diameter defined by the nominal diameter D2, the annular plate may have an outer diameter √2 times as large as the flange diameter D3, and the specific color exhibiting region may be a region in a color indicating pressing at the pressure equal to or higher than 25 MPa.

In the tightening test, ratio S1/S2 in the terminal in the embodiment is appropriately calculated with good reproducibility.

<3> In the terminal described in <1> or <2> above, ratio S1/S2 may be equal to or lower than 0.5.

In the terminal having ratio S1/S2 equal to or lower than 0.5, the pressure applied to the region having first area S1 is very high. Such a terminal is very securely connected to the attachment target by the bolt.

<4> In the terminal according to any one of <1> to <3> above, ratio S1/S2 may be equal to or higher than 0.1.

In the terminal having ratio S1/S2 equal to or higher than 0.1, an area of first area S1 is sufficiently secured. Therefore, the contact resistance between the terminal and the attachment target tends to be low.

<5> In the terminal described in any one of <1> to <4> above, the aluminum alloy may contain at least 0.01 mass % and at most 1.50 mass % of silicon and at least 0.01 mass % and at most 2.00 mass % of magnesium.

The aluminum alloy composed as above is excellent in conductivity and readily achieves the Vickers hardness equal to or higher than 80 HV.

<6> In the terminal described in any one of <1> to <5> above, the terminal may have a conductivity not lower than 40% IACS and not higher than 63% IACS.

As the terminal has the conductivity above, an amount of generation of heat by the terminal is suppressed. Consequently, thermal damage to the terminal and the attachment target connected to the terminal is lessened. In addition, thermal shock at the interface between the terminal and the attachment target is lessened. Furthermore, deterioration of a conductor connected to the terminal and a conductor connected to the attachment target is readily suppressed.

<7> In the terminal described in any one of <1> to <6> above, the terminal may have the Vickers hardness equal to or lower than 160 HV.

When the terminal has the Vickers hardness equal to or lower than 160 HV, the projection of the asperity portion of the terminal tends to moderately collapse at the time of connection between the terminal and the attachment target. Consequently, the oxide coating in the vicinity of the projection of the asperity portion tends to be broken, and conduction between the terminal and the attachment target is readily secured.

<8> In the terminal described in any one of <1> to <7> above, in at least a part of the first surface, the aluminum or the aluminum alloy may be exposed to the outside.

"Aluminum or the aluminum alloy being exposed to the outside" in the present disclosure means that an artificially formed coating is not provided on an outer periphery of aluminum or the aluminum alloy. This "artificially formed coating" refers to a conductive coating formed for the purpose of lowering in contact resistance between the terminal and the attachment target, such as a conductive plated layer. Therefore, the "artificially formed coating" does not encompass a natural oxide film. The natural oxide film is not artificially formed or not conductive. The natural oxide film is, for example, a coating of aluminum oxide. In addition, the “artificially formed coating” does not encompass inevitable surface contamination, specifically, an organic substance, a hydrate, and moisture.

The coating artificially formed in the terminal can lower the contact resistance between the terminal and the attachment target. In contrast, artificial formation of a coating requires time and efforts and cost. The terminal in the present disclosure can achieve lowering in contact resistance against the attachment target owing to a prescribed Vickers hardness and the asperity portion, without the artificially formed coating. The terminal without the artificially formed coating is excellent in productivity.

<9> In the terminal described in any one of <1> to <8> above, a hardness ratio calculated by dividing the Vickers hardness of the terminal by the Vickers hardness of the attachment target may be not lower than 1 and not higher than 1.25.

The hardness ratio not lower than 1 means that the terminal is harder than the attachment target. The hardness ratio being not higher than 1.25 means that the terminal is not excessively harder than the attachment target. The hardness ratio not lower than 1 and not higher than 1.25 tends to lead to lowering in contact resistance between the terminal and the attachment target.

<10> In the terminal described in any one of <1> to <9> above, the asperity portion may be provided with a plurality of grooves and the plurality of grooves may each be a V groove.

The V groove means a groove having a contour in a V shape, in a cross-section orthogonal to a direction along the groove. An opening edge of the V groove tends to be engaged in the attachment target. Therefore, the asperity portion provided with the V groove tends to lower the contact resistance between the terminal and the attachment target.

<11> In the terminal described in <10> above, an angle formed between sidewalls of two adjacent V grooves among the plurality of grooves may be larger than 90° and equal to or smaller than 140°.

When the angle is larger than 90° and equal to or smaller than 140°, the opening edge of the V groove tends to be engaged in the attachment target.

<12> A terminal-equipped electric wire according to the embodiment includes the terminal according to any one of <1> to <11> and an electric wire connected to the terminal.

The terminal-equipped electric wire can achieve suppression of increase in contact resistance over time at the interface between the terminal and the attachment target. The terminal-equipped electric wire strong against thermal shock and vibration is used, for example, for in-vehicle wiring in a hybrid vehicle and an electric vehicle.

<13> A connection structure according to the embodiment includes the terminal according to any one of <1> to <11>, an attachment target, and a bolt that connects the terminal and the attachment target to each other.

The connection structure can achieve suppression of increase in contact resistance at the interface between the terminal and the attachment target for a long time. Therefore, an apparatus provided with the connection structure, such as a hybrid vehicle, tends to maintain its performance for a long time.

<14> In the connection structure described in <13> above, a material for the attachment target may be copper or a copper alloy.

Copper or the copper alloy is relatively readily deformed. Therefore, the projection of the asperity portion of the terminal is readily engaged in the attachment target and connection between the terminal and the attachment target is secure. Since copper or the copper alloy has high conductivity, an amount of generation of heat by the attachment target is suppressed.

<15> In the connection structure described in <13> or <14> above, a surface of the attachment target may further be provided with a coating layer.

The coating layer can prevent surface change over time of the attachment target. Surface change refers, for example, to surface oxidation. By preventing surface oxidation of the attachment target, the contact resistance between the terminal and the attachment target can be lowered. The coating layer improves solderability and ease in brazing of the attachment target. The contact resistance in joint of a conductor formed from a metallic wire to the attachment target can be lowered.

<16> In the connection structure described in <15> above, the coating layer may contain at least one selected from gold, silver, tin, and nickel.

The above-mentioned element tends to prevent surface oxidation of the attachment target composed of copper or the copper alloy. Therefore, increase in contact resistance at the interface between the terminal and the attachment target tends to be suppressed.

<17> In the connection structure described in <13> above,

- the ratio S1/S2 may be equal to or lower than 0.4,
- a material for the terminal may be 6061 or 6056 defined under the international alloy designation system,
- the terminal may have a conductivity not lower than 40% IACS and not higher than 50% IACS,
- the terminal may have the Vickers hardness not lower than 90 HV and not higher than 110 HV,
- a material for the bolt may be SNB7 steel defined under JIS G 4107,
- the bolt may have the nominal diameter D2 of 6 mm,
- the bolt may have the flange diameter D3 of 13 mm,
- a material for the attachment target may be copper, and
- a surface of the attachment target may be further provided with a coating layer.

The connection structure can achieve suppression of increase in contact resistance at the interface between the terminal and the attachment target for a long time. The conductivity and the Vickers hardness of the terminal are achieved by tempering treatment. The tempering treatment includes, for example, cold working, heating after cold working, solution quenching, and aging treatment.

DETAILS OF THE EMBODIMENTS OF THE PRESENT DISCLOSURE

Embodiments of the terminal, the terminal-equipped electric wire, and the connection structure in the present disclosure will be described below with reference to the drawings. Elements identical in name have identical reference numerals allotted in the drawings. The present invention is not limited to the construction shown in the embodiment but is defined by the terms of the claims, and is intended to include any modifications within the scope and meaning equivalent to the terms of the claims.

First Embodiment

<<Overall Construction>>

A connection structure 1 in the present example shown in FIG. 1 includes a terminal 2, an attachment target 3, and a bolt 4. A form of terminal 2 is not particularly limited so long as it is constructed to be connected to attachment target 3 by bolt 4. Terminal 2 in the present example is a part of a terminal-equipped electric wire 10. Terminal-equipped electric wire 10 is composed of an electric wire 5 and terminal 2 independent of electric wire 5. Unlike the present example, terminal 2 may be a part of a bus bar or a part of a single-core wire. Each component of connection structure 1 will be described below in detail.

<<Terminal>>

Terminal 2 is provided with a first surface 21 and a second surface 22. First surface 21 is a surface that faces attachment target 3 while terminal 2 is connected to attachment target 3. First surface 21 includes a portion superimposed on attachment target 3 and a portion not superimposed thereon. Second surface 22 is a surface opposite to first surface 21. Terminal 2 is provided with a through hole 2*h* that opens in first surface 21 and second surface 22. Bolt 4 passes through through hole 2*h*.

Terminal 2 in the present example includes a wire barrel 29 that holds a conductor 50 of electric wire 5. Terminal 2 may further include an insulation barrel that holds an insulation coating 51 of electric wire 5. A position of a connection surface of electric wire 5 is not limited, and the connection surface may be first surface 21, second surface 22, or another surface orthogonal thereto. Instead of wire barrel 29, electric wire 5 may be connected to terminal 2 by welding or solid phase bonding. Examples of such a bonding method include resistance welding, laser welding, ultrasonic welding, and friction stir welding.

A size of terminal 2 is determined depending on an application of terminal 2. For example, terminal 2 has a length, that is, a length along a direction of extension of electric wire 5, not smaller than 5 mm and not larger than 200 mm. Terminal 2 may have a length not smaller than 10 mm and not larger than 50 mm. A thickness of terminal 2, that is, a distance between first surface 21 and second surface 22 is, for example, not smaller than 0.1 mm and not larger than 7 mm. Terminal 2 may have a thickness, for example, not smaller than 0.3 mm and not larger than 4 mm or not smaller than 0.5 mm and not larger than 3 mm.

Figure 2:
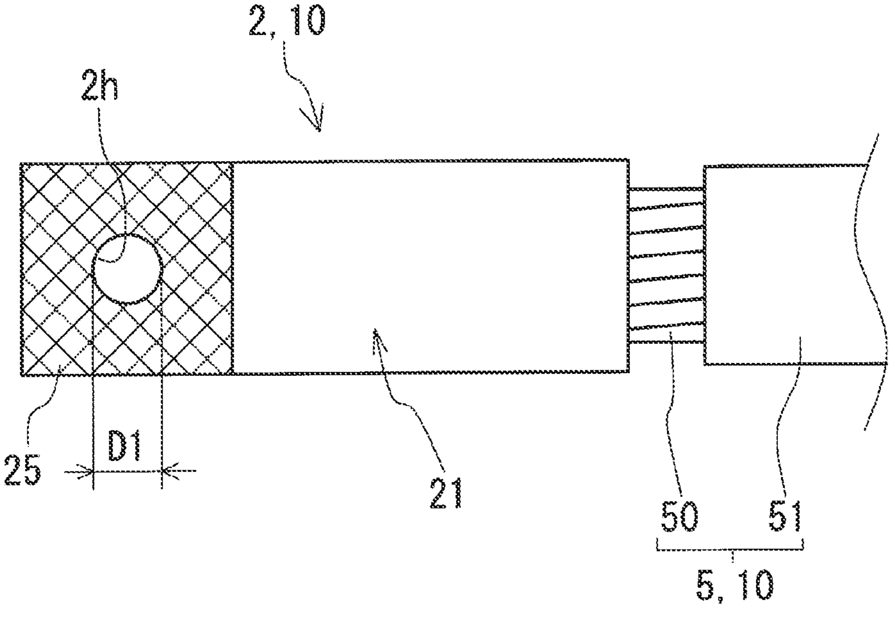
FIG. 2 is a schematic plan view of a terminal-equipped electric wire according to the first embodiment.

Through hole 2*h* shown in FIG. 2 has a circular shape. Through hole 2*h* has an inner diameter D1, for example, not smaller than 4 mm and not larger than 20 mm. Unlike the present example, through hole 2*h* may be in a shape of an elongated hole. Inner diameter D1 of through hole 2*h* in the shape of the elongated hole is defined by a diameter of a smallest circle inscribed in through hole 2*h*. Through hole 2*h* may be in a shape of a slit that reaches an outer peripheral portion of terminal 2.

Figure 3:
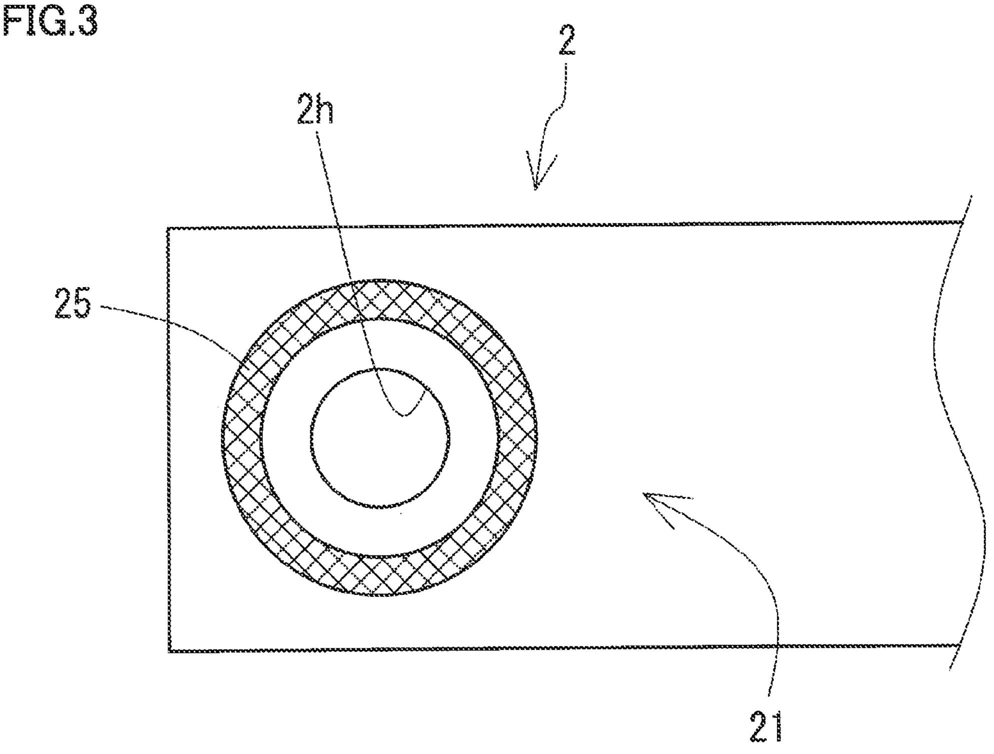
FIG. 3 is a schematic partial plan view of a terminal-equipped electric wire different from one in FIG. 2.

Terminal 2 is provided with an asperity portion 25 at a position in first surface 21 superimposed on attachment target 3. Asperity portion 25 is provided in a region shown with cross-hatching in FIG. 2, that is, around through hole 2*h* in first surface 21. Asperity portion 25 serves to strengthen connection between terminal 2 and attachment target 3. A contour of an outer periphery of asperity portion 25 is rectangular. A contour of an inner periphery of this asperity portion 25 is circular along through hole 2*h*. As shown in FIG. 3, asperity portion 25 may be annular. The contour of the inner periphery of annular asperity portion 25 shown in FIG. 3 is larger than through hole 2*h*. The contour of the inner periphery of annular asperity portion 25 may coincide with through hole 2*h*. The contour of the outer periphery of asperity portion 25 does not have to be rectangular or circular, and may be oval or the like.

Figure 4:
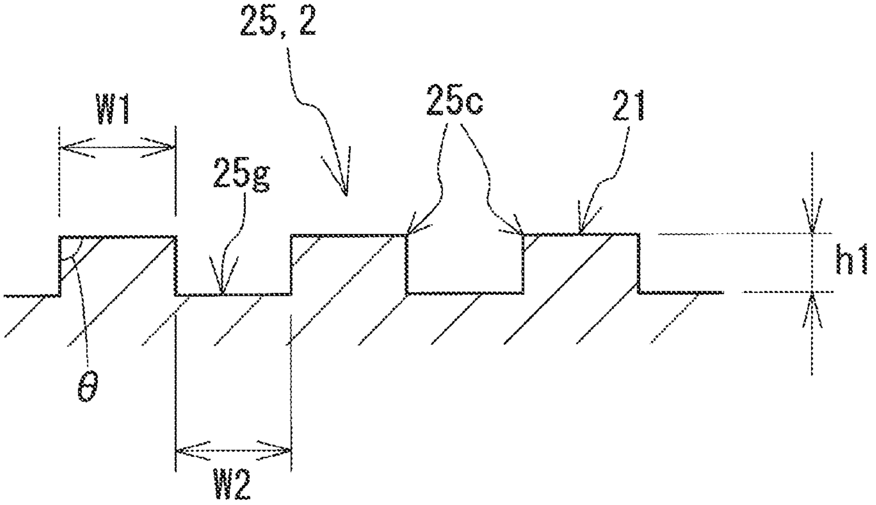
FIG. 4 is a cross-sectional view of an asperity portion of a terminal in the first embodiment.
Figure 5:
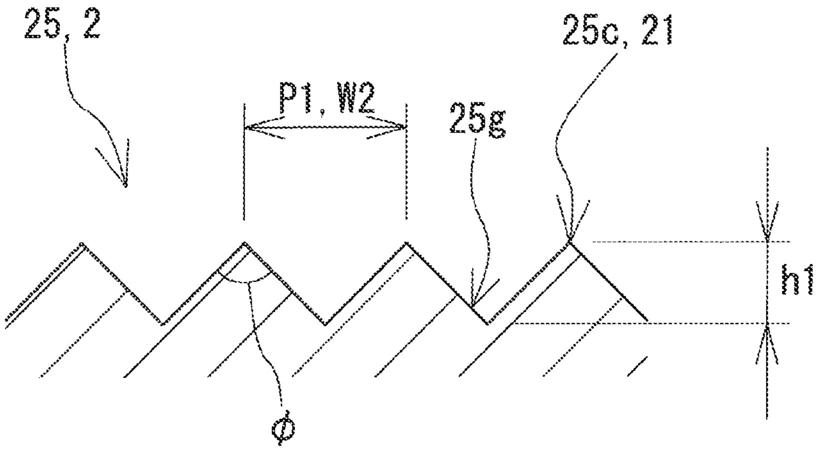
FIG. 5 is a cross-sectional view of an asperity portion different from one in FIG. 4.

Asperity portion 25 in the present example is composed of first surface 21 and a plurality of grooves 25*g* provided in first surface 21 as shown in FIGS. 4 and 5. FIGS. 4 and 5 are each a cross-sectional view of terminal 2 along a plane orthogonal to a direction along grooves 25*g*. The plurality of grooves 25*g* may be in parallel to one another or may intersect with one another like cross-hatching. The plurality of grooves 25*g* in parallel are desirably aligned in a direction of length of terminal 2. The plurality of annular grooves 25*g* may be aligned concentrically in asperity portion 25. Unlike the present example, asperity portion 25 may include a plurality of protrusions that protrude from first surface 21. In that case, the protrusion implements a projection of asperity portion 25 and first surface 21 implements a recess. A region recessed relative to first surface 21 may be provided as a relative projection and a further recessed region may be provided as a relative recess. The shape of the protrusion is not particularly limited so long as a ratio S1/S2 between a first area S1 and a second area S2 which will be described later can be achieved. The shape of the protrusion is, for example, a shape of a prism, a polygonal pyramid, a frustum of a pyramid, a column, a cone, a frustum of a cone, or a hemisphere. A vertex of the protrusion may be curved at any radius of curvature R. The shape of the protrusion may be asymmetric with respect to a centerline that extends in a protruding direction of the protrusion.

Groove 25*g* shown in FIG. 4 has a rectangular cross-sectional shape. In this case, each groove 25*g* defines the recess of asperity portion 25 and first surface 21 defines the projection of asperity portion 25. A region that protrudes relative to first surface 21 may be provided as the projection and a region recessed relative to first surface 21 may be provided as the recess. A region recessed relative to first surface 21 may be provided as a relative projection and a further recessed region may be provided as a relative recess. A border between first surface 21 and groove 25*g* defines a corner 25*c* of asperity portion 25. Corner 25*c* may be rounded. A width W1 of the projection, that is, an interval between two adjacent grooves 25*g* and 25*g*, is, for example, larger than 0 mm and equal to or smaller than 5 mm. Width W1 may be, for example, not smaller than 0.01 mm and not larger than 2 mm. A width W2 of an opening of groove 25*g* is, for example, not smaller than 0.01 mm and not larger than 3 mm. Width W2 may be, for example, not smaller than 0.02 mm and not larger than 1 mm. A depth of groove 25*g*, that is, a height h1 of the projection, is, for example, not smaller than 0.005 mm and not larger than 1 mm. Height h1 may be not smaller than 0.01 mm and not larger than 0.6 mm. Radius of curvature R of corner 25*c* may be, for example, not smaller than 0.01 mm and not larger than 1 mm. Radius of curvature R of corner 25*c* may be not smaller than 0.01 mm and not larger than 0.8 mm. An angle θ formed between a sidewall of groove 25*g* shown in FIG. 4 and first surface 21 is 90°. This angle θ may be not smaller than 90° and not larger than 160°. This angle θ may be not smaller than 90° and not larger than 150°. Individual angles θ do not have to be equal to one another. When individual angles θ are not equal, working accuracy does not have to excessively be enhanced, and hence production cost can readily be lowered. A bottom surface of groove 25*g* does not have to be planar but may be curved. The bottom surface and the sidewall of groove 25*g* may be connected to each other as being smoothly curved. When the bottom surface of groove 25*g* is curved or connected to the sidewall as being smoothly curved, stress caused by vibration or thermal shock to terminal 2 is less likely to concentrate around the bottom surface or the sidewall of groove 25*g*, and hence terminal 2 is less likely to break. Since accuracy in working of groove 25*g* does not have to excessively be enhanced, production cost of terminal 2 is readily lowered.

Groove 25*g* shown in FIG. 4 may decrease in width toward the bottom thereof. FIG. 5 shows such an exemplary groove 25*g*. Groove 25*g* in FIG. 5 is in a V shape in the cross-section orthogonal to the direction along groove 25*g*. In other words, groove 25*g* is a V groove. An interval between two adjacent grooves 25*g* in FIG. 5 is 0 mm. In this case, a projection having a cross-section in a shape of a crest is provided in asperity portion 25. The border between adjacent grooves 25*g* and 25*g*, that is, a vertex of the projection having the cross-section in the shape of the crest, defines corner 25*c*. Corner 25*c* may be rounded. An interval between two adjacent corners 25*c*, that is, a pitch P1, is, for example, not smaller than 0.4 mm and not larger than 5 mm. Pitch P1 in the present example is also width W2 of an opening of groove 25*g*. Pitch P1 may be, for example, not smaller than 0.5 mm and not larger than 3 mm. Height h1 of the projection having the cross-section in the shape of the crest, that is, the depth of groove 25*g* which is the length from the bottom of groove 25*g* to corner 25*c* in a perpendicular direction, is, for example, not smaller than 0.005 mm and not larger than 1 mm. Height h1 may be, for example, not smaller than 0.01 mm and not larger than 0.5 mm. Radius of curvature R of corner 25*c* may be, for example, not smaller than 0.01 mm and not larger than 1 mm. Radius of curvature R of corner 25*c* may be not smaller than 0.01 mm and not larger than 0.05 mm. An angle ϕ formed between the sidewalls of two adjacent grooves 25*g* shown in FIG. 5 is 90°. This angle ϕ is not limited to 90°, but may be not smaller than 60° and not larger than 170°. This angle ϕ may be not smaller than 80° and not larger than 160°, or larger than 90° and equal to or smaller than 140°. Individual angles ϕ do not have to be equal to one another. When individual angles ϕ are not equal, working accuracy does not have to excessively be enhanced, and hence production cost is readily lowered. The bottom surface of groove 25*g* may be curved or planar as being connected to the sidewall in a smoothly curved manner. When the bottom surface of groove 25*g* is curved or planar, stress caused by vibration or thermal shock to terminal 2 is less likely to concentrate around the bottom surface of groove 25*g* in the V shape, and hence terminal 2 is less likely to break. Since accuracy in working of groove 25*g* does not have to excessively be enhanced, production cost of terminal 2 is readily lowered.

Corner 25*c* of asperity portion 25 is engaged in attachment target 3 at the time of connection between terminal 2 and attachment target 3. At that time, corner 25*c* is deformed by attachment target 3. This deformation breaks the oxide coating on corner 25*c*, and terminal 2 and attachment target 3 electrically conduct to each other. As asperity portion 25 is pressed against attachment target 3 at a defined pressure or higher, terminal 2 and attachment target 3 are securely connected to each other for a long time.

A material for terminal 2 is aluminum or an aluminum alloy. A surface of terminal 2 is not provided with a coating layer. The aluminum alloy is an alloy mainly composed of aluminum, such as an alloy containing at least 80 mass % of aluminum. The aluminum alloy contains, for example, at least 0.01 mass % and at most 1.50 mass % of silicon and at least 0.01 mass % and at most 2.00 mass % of magnesium, in addition to aluminum. The aluminum alloy may further contain at least one additive element selected from the group consisting of copper, manganese, iron, chromium, zirconium, and titanium. When the aluminum alloy contains an additive element, it may essentially contain at least one of manganese and copper. A content of copper is, for example, not lower than 0.1 mass % and not higher than 1.2 mass %. A content of manganese is, for example, not lower than 0 mass % and not higher than 1.5 mass %. A content of iron is, for example, not lower than 0 mass % and not higher than 0.8 mass %. A content of chromium is, for example, not lower than 0 mass % and not higher than 0.4 mass %. A content of zinc is, for example, not lower than 0 mass % and not higher than 0.8 mass %. A content of titanium is, for example, not lower than 0 mass % and not higher than 0.2 mass %. A total content of titanium and zirconium is, for example, not lower than 0 mass % and not higher than 0.3 mass %. The aluminum alloy is, for example, 6061 or 6056 defined under the international alloy designation system.

Terminal 2 has a Vickers hardness equal to or higher than 80 HV. The Vickers hardness is measured in conformity with JIS Z 2244-1:2020. The aluminum alloy containing silicon and magnesium tends to meet the Vickers hardness equal to or higher than 80 HV. As the Vickers hardness is higher, corner 25*c* of the projection of asperity portion 25 tends to be engaged in attachment target 3 when terminal 2 and attachment target 3 are tightened by bolt 4. As the Vickers hardness is higher, terminal 2 is less likely to experience creep deformation when terminal 2 generates heat by conduction. Consequently, axial force of bolt 4 can be prevented from decreasing. An upper limit of the Vickers hardness of terminal 2 is, for example, 160 HV. Corner 25*c* of terminal 2 having the Vickers hardness equal to or lower than 160 HV is moderately deformed by attachment target 3 when it is engaged in attachment target 3. An oxide coating of aluminum tends to be broken at deformed corner 25*c*. A range of the Vickers hardness is, for example, not lower than 80 HV and not higher than 160 HV or furthermore, not lower than 85 HV and not higher than 150 HV. The range of the Vickers hardness may be not lower than 90 HV and not higher than 140 HV or not lower than 90 HV and not higher than 110.

Terminal 2 has a conductivity, for example, not lower than 40% IACS and not higher than 63% IACS. The conductivity is measured in conformity with JIS H 0505:1975. The aluminum alloy containing silicon and magnesium tends to meet the above-mentioned conductivity. As terminal 2 has the above-mentioned conductivity, an amount of heat generation in terminal 2 is suppressed. Consequently, thermal damage to electric wire 5 connected to terminal 2 and to attachment target 3 is mitigated. The conductivity may be not lower than 41% IACS and not higher than 60% IACS or not lower than 42% IACS and not higher than 58% IACS. In addition, the conductivity may be not lower than 40% IACS and not higher than 50% IACS.

Terminal 2 provided with asperity portion 25 satisfies a prescribed condition while first surface 21 and attachment target 3 are connected to each other by tightening of bolt 4. The condition is that ratio S1/S2 between first area S1 and second area S2 is equal to or lower than 0.8. Ratio S1/S2 is an indicator indicating that terminal 2 and attachment target 3 are connected to each other with connection strength not less than prescribed strength. Ratio S1/S2 is equal to or lower than 0.7 or furthermore equal to or lower than 0.6. Ratio S1/S2 may be equal to or lower than 0.5 or equal to or lower than 0.4. A lower limit value of ratio S1/S2 is, for example, 0.1. Therefore, a range of ratio S1/S2 is, for example, not lower than 0.1 and not higher than 0.8, not lower than 0.1 and not higher than 0.7, not lower than 0.1 and not higher than 0.6, not lower than 0.1 and not higher than 0.5, or not lower than 0.1 and not higher than 0.4.

First area S1 is an area of a region where first surface 21 is in contact with attachment target 3 at a pressure equal to or higher than a defined value. The defined value is, for example, 25 MPa. First area S1 is obtained in a tightening test shown in a test example which will be described later. First area S1 is equal to or larger than 5 $mm^2$. When first area S1 is equal to or larger than 5 $mm^2$, terminal 2 and attachment target 3 tend to mechanically securely be connected to each other and strength of connection therebetween tends to be maintained for a long time. As first area S1 is larger, the connection strength is higher. First area S1 may be, for example, equal to or larger than 6 $mm^2$ or equal to or larger than 7 $mm^2$. The upper limit of first area S1 is restricted by ratio S1/S2. In other words, the lower limit of ratio S1/S2 is restricted by first area S1.

Second area S2 is an area of a prescribed annular region. The annular region is a virtual region having an inner diameter defined by a nominal diameter D2 of bolt 4 determined based on inner diameter D1 of through hole 2*h* and an outer diameter defined by a flange diameter D3 of bolt 4. In other words, relation of $S2=\pi(D3/2)^2-\pi(D2/2)^2$ is satisfied. Bolt 4 is selected such that terminal 2 and attachment target 3 are appropriately tightened when it is arranged in through hole 2*h* having inner diameter D1. Nominal diameter D2 and flange diameter D3 of bolt 4 can be selected as appropriate depending on a position where terminal 2 is applied. A criterion for selection is illustrated as below. Nominal diameter D2 corresponds to a diameter of a shaft portion 40 of bolt 4 corresponding to inner diameter D1. Flange diameter D3 corresponds to an outer diameter of a range in second surface 22 of terminal 2 where axial force of bolt 4 is substantially applied. For tightening by bolt 4, bolt 4 provided with a flange portion 42 under a head portion 41 is employed. In tightening by bolt 4 without a flange portion, a washer is employed. An outer diameter of the flange portion appropriate in accordance with nominal diameter D2 should only be determined with reference to annex JA.3 of JIS B 1189: 2014. In the case of bolt 4 provided with the flange portion, a value calculated by multiplying the outer diameter of flange portion by 0.929 can be regarded as flange diameter D3. When a washer is arranged between bolt 4 and terminal 2, a value calculated by multiplying the outer diameter of the washer by 0.929 can be regarded as flange diameter D3. Nominal diameter D2 may be equal to inner diameter D1. Flange diameter D3 is larger than inner diameter D1 and nominal diameter D2. For example, when inner diameter D1 is not smaller than 4 mm and smaller than 5 mm, nominal diameter D2 is 4 mm and flange diameter D3 is 9.8 mm. Nominal diameter D2 and flange diameter D3 may be changed depending on an application of terminal 2. A person skilled in the art could select appropriate nominal diameter D2 and flange diameter D3 depending on an application.

In an example where axial force of bolt 4 is constant, as a ratio of first area S1 to second area S2 is lower, a pressure applied to the region having first area S1 increases. When ratio S1/S2 is equal to or lower than 0.8 and first area S1 is equal to or larger than 5 $mm^2$, terminal 2 and attachment target 3 tend to mechanically securely be connected to each other and strength of connection therebetween tends to be maintained for a long time. Consequently, the contact resistance between terminal 2 and attachment target 3 is less likely to increase over time.

<<Electric Wire>>

Electric wire 5 includes conductor 50 and insulation coating 51 that covers an outer periphery of conductor 50. Conductor 50 may have an outer diameter, for example, not smaller than 0.1 mm and not larger than 50 mm or not smaller than 0.4 mm and not larger than 30 mm. Conductor 50 in the present example is a stranded wire obtained by twisting a plurality of elemental wires. Conductor 50 is composed, for example, of copper, a copper alloy, aluminum, or an aluminum alloy.

Insulation coating 51 may have a thickness, for example, not smaller than 0.1 mm and not larger than 10 mm or not smaller than 0.2 mm and not larger than 5 mm. Insulation coating 51 is mainly composed, for example, of a polyolefin-based resin. The polyolefin-based resin is, for example, polyethylene or polypropylene. Insulation coating 51 may be composed of a silicone-based resin.

<<Attachment Target>>

Attachment target 3 is not particularly limited so long as it is in a form connectable to terminal 2 with bolt 4. Attachment target 3 in the present example is in a shape of a terminal. Attachment target 3 is provided with a through hole 3*h* through which bolt 4 passes.

Attachment target 3 is composed, for example, of copper or a copper alloy. Copper or the copper alloy is relatively readily deformed. Therefore, corner 25*c* of asperity portion 25 of terminal 2 is readily engaged in attachment target 3 and connection between terminal 2 and attachment target 3 becomes secure. The Vickers hardness of attachment target 3 is, for example, lower than twice as high as the Vickers hardness of terminal 2. In this case, the projection of asperity portion 25 of terminal 2 is readily engaged in attachment target 3 and connection between terminal 2 and attachment target 3 tends to be secure.

Attachment target 3 in the present example is provided with a coating layer 31 on a surface thereof. Coating layer 31 is representatively a metallic layer formed by plating. Coating layer 31 in the present example is a plated layer. Coating layer 31 fills a gap at the interface between terminal 2 and attachment target 3 when terminal 2 and attachment target 3 rub against each other. Therefore, the fresh surface of aluminum of terminal 2 is less likely to be oxidized and the contact resistance between terminal 2 and conductor 3 is less likely to increase. Coating layer 31 should only be provided at least in a portion in contact with terminal 2. Coating layer 31 is not essential.

Coating layer 31 may contain at least one selected from gold, silver, tin, and nickel. Coating layer 31 containing the afore-mentioned element is readily in intimate contact with attachment target 3 composed of copper or the copper alloy. Therefore, increase in contact resistance at the interface between terminal 2 and attachment target 3 is readily suppressed. When the Vickers hardness of coating layer 31 is lower than the Vickers hardness of copper or the copper alloy contained in a main body of attachment target 3, increase in contact resistance at the interface between terminal 2 and attachment target 3 is readily suppressed.

<<Bolt>>

Bolt 4 tightens terminal 2 and attachment target 3 to connect terminal 2 and attachment target 3 to each other. Bolt 4 includes shaft portion 40 and head portion 41. Bolt 4 in the present example further includes flange portion 42. Flange portion 42 abuts on second surface 22 of terminal 2. A nut 4*n* is fitted to shaft portion 40. Nut 4*n* abuts on attachment target 3. Terminal 2 and attachment target 3 are tightened between flange portion 42 of bolt 4 and nut 4*n*. In the case of bolt 4 without flange portion 42, a washer is arranged between head portion 41 and terminal 2.

Bolt 4 is composed, for example, of steel. Bolt 4 may be composed, for example, of SNB7 steel defined under JIS G 4107:2010.

First Test Example

In a test example, a plurality of samples that simulated terminal 2 in the first embodiment were made and ratio S1/S2 of each sample was obtained in a tightening test. A test structure body that simulated connection structure 1 in the first embodiment was made, and a thermal shock test of the test structure body was conducted.

<<Sample>>

Sample No. 1

Figure 6:
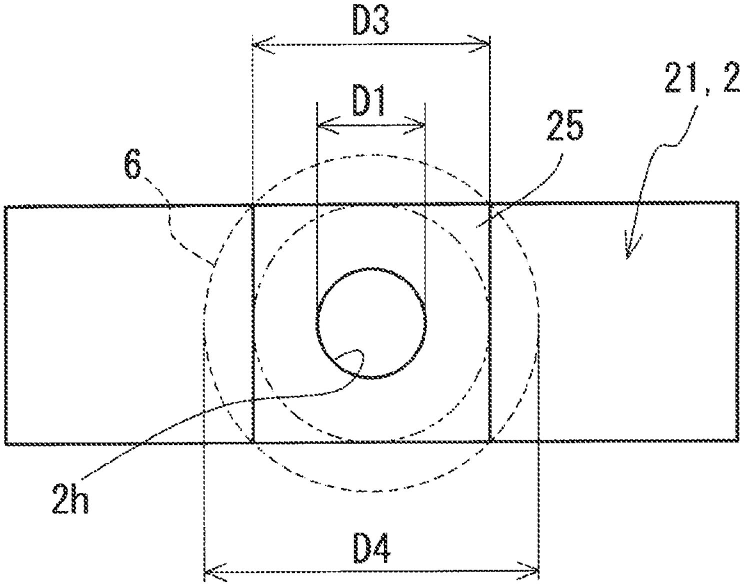
FIG. 6 is a schematic plan view of a terminal used in a tightening test.

Terminal 2 of sample No. 1 was in a shape shown in FIG. 6. Terminal 2 was a rectangular plate of 14 mm×40 mm. Terminal 2 had a thickness of 2.0 mm. Terminal 2 was provided with through hole 2*h* concentric with a center of an area of terminal 2. Through hole 2*h* had inner diameter D1 of 7 mm. A material for sample No. 1 was 6056 defined under the international alloy designation system. A temper designation of the material was T7. Terminal 2 had the Vickers hardness of 100 HV. The Vickers hardness was measured in conformity with JIS Z 2244-1:2020. The Vickers hardness was a median value of measurement values at twenty points. Terminal 2 was not provided with an artificially formed conductive coating, which was similar in any terminal in the description that follows.

Asperity portion 25 of sample No. 1 included a plurality of rectangular grooves 25*g* as shown in FIG. 4. The plurality of grooves 25*g* were in parallel to one another. Width W1 was 0.4 mm and width W2 was 0.6 mm. Height h1 was 0.2 mm. Thirteen grooves 25*g* were provided, corner 25*c* had radius of curvature R of 0.03 mm, and angle θ was 90°.

Sample No. 2

Sample No. 2 was different from sample No. 1 only in shape of asperity portion 25. Asperity portion 25 of sample No. 2 had a plurality of V-shaped grooves 25*g* as shown in FIG. 5. The plurality of grooves 25*g* were in parallel to one another. Pitch P1 was 1 mm and height h1 was 0.5 mm. Thirteen grooves 25*g* were provided, corner 25*c* had radius of curvature R of 0.03 mm, and angle ϕ formed between the sidewalls of two adjacent grooves 25*g* was 90°.

Sample No. 3

Sample No. 3 was different from sample No. 1 only in widths W1 and W2, height h1, and angle θ. Groove 25*g* was a tapered groove 25*g* smaller in width at the bottom than at the opening. In other words, groove 25*g* had a cross-section in a shape of an inverted isosceles trapezoid. The projection of asperity portion 25 had a cross-section in a shape of an isosceles trapezoid. Width W1 was 0.45 mm, width W2 was 0.55 mm, height h1 was 0.02 mm, and angle θ was 105°.

Sample No. 4

Sample No. 4 was different from sample No. 1 only in shape of asperity portion 25. An outer geometry of asperity portion 25 of sample No. 4 was in an annular shape as shown in FIG. 3. The annular shape had an inner diameter of 10.0 mm and an outer diameter of 11.4 mm. Asperity portion 25 included a plurality of concentrically arranged grooves 25*g*. Groove 25*g* had a cross-section in a shape of an inverted isosceles trapezoid and the projection of asperity portion 25 had a cross-section in a shape of an isosceles trapezoid. Width W1 was 0.06 mm, width W2 was 0.2 mm, height h1 was 0.28 mm, radius of curvature R of corner 25*c* was 0.03 mm, angle θ was 110°, three grooves 25*g* were provided, and two projections were provided.

Sample No. 5

Sample No. 5 was different from sample No. 4 in inner diameter and outer diameter of the annular shape of asperity portion 25, widths W1 and W2, height h1, radius of curvature R of corner 25*c*, and angle θ. The inner diameter was 8.0 mm, the outer diameter was 9.1 mm, width W1 was 0.12 mm, width W2 was 0.31 mm, height h1 was 0.4 mm, radius of curvature R of corner 25*c* was 0.03 mm, and angle θ was 90°.

Sample No. 6

Sample No. 6 was different from sample No. 2 only in shape of asperity portion 25. Asperity portion 25 of sample No. 6 was provided with a plurality of parallel grooves 25*g* and a plurality of other grooves 25*g* orthogonal to the plurality of grooves 25*g*. Asperity portion 25 had what is called quadrangular knurls. Pitch P1 was 1 mm, height h1 was 0.5 mm, radius of curvature R of corner 25*c* was 0.03 mm, and angle ϕ formed between the sidewalls of two adjacent grooves 25*g* was 90°.

Sample No. 101

Sample No. 101 was different from sample No. 1 only in widths W1 and W2. Width W1 was 0.7 mm and width W2 was 0.3 mm.

Sample No. 102

Sample No. 102 was the same as sample No. 1 except for absence of the asperity portion.

Sample No. 103

Sample No. 103 was the same as sample No. 2 except for the material. Sample No. 103 was composed of 6101 defined under the international alloy designation system. The temper designation of the material was T6. Sample No. 103 had the Vickers hardness of 71 HV.

<<Tightening Test>>

Figure 7:
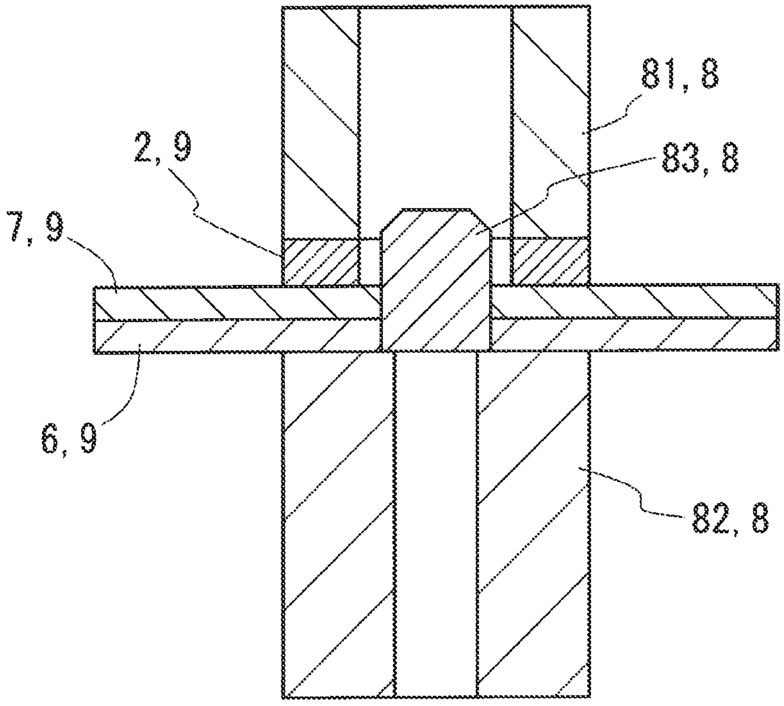
FIG. 7 is an illustrative view illustrating overview of the tightening test.

FIG. 7 is a schematic diagram of the tightening test. In the tightening test, an annular plate 6 and a pressure-sensitive sheet 7 were prepared in addition to terminal 2 of the sample. The material for annular plate 6 was C1100-1/4H defined under JIS H 3100:2018. C1100 represents to tough pitch copper. Annular plate 6 had the Vickers hardness of 78 HV. Annular plate 6 had a thickness of 1.5 mm. As shown with a dashed line in FIG. 6, in the tightening test, annular plate 6 was superimposed on terminal 2. The inner diameter of annular plate 6 was equal to nominal diameter D2 of bolt 4 (FIG. 1). Outer diameter D4 of annular plate 6 was √2 times as large as a length of a diagonal of a square circumscribed about a circle having flange diameter D3 shown with a chain double dotted line, that is, flange diameter D3. In the example shown in FIG. 6, the square and the outer geometry of asperity portion 25 were identical to each other. Table 1 shows relation among inner diameter D1, nominal diameter D2, flange diameter D3, and outer diameter D4. Numerical values in Table 1 were set based on the already described selection criterion.

TABLE 1

| Inner Diameter D1 of Through Hole (mm) | Nominal Diameter D2 (mm) | Flange Diameter D3 (mm) | Outer Diameter D4 of Annular Plate (mm) |
|---|---|---|---|
| 4 mm or larger, and smaller than 5 mm | 4 | 9.8 | 13.8 |
| 5 mm or larger, and smaller than 6 mm | 5 | 11.1 | 15.8 |
| 6 mm or larger, and smaller than 8 mm | 6 | 13.0 | 18.4 |
| 8 mm or larger, and smaller than 10 mm | 8 | 16.3 | 23.0 |
| 10 mm or larger, and smaller than 12 mm | 10 | 19.5 | 27.6 |
| 12 mm or larger, and smaller than 14 mm | 12 | 23.2 | 32.8 |

TABLE 1-continued

| Inner Diameter D1 of Through Hole (mm) | Nominal Diameter D2 (mm) | Flange Diameter D3 (mm) | Outer Diameter D4 of Annular Plate (mm) |
|---|---|---|---|
| 14 mm or larger, and smaller than 16 mm | 14 | 26.9 | 38.1 |
| 16 mm or larger, and smaller than 20 mm | 16 | 30.7 | 43.4 |

A tightening apparatus 8 shown in FIG. 7 was provided with an upper punch 81, a lower punch 82, and a positioning pin 83. Upper punch 81 was in a cylindrical shape. A material for upper punch 81 was S50C. An outer diameter of upper punch 81 was equal to flange diameter D3 and an inner diameter thereof was equal to nominal diameter D2. Lower punch 82 was in a cylindrical shape. A material for lower punch 82 was S50C. An outer diameter of lower punch 82 was equal to flange diameter D3. An inner diameter of lower punch 82 was smaller than nominal diameter D2. In the present example, positioning pin 83 was arranged on an end surface of lower punch 82. Positioning pin 83 may be pressed into a hole in lower punch 82.

Annular plate 6, pressure-sensitive sheet 7, and terminal 2 were set in this order on the end surface of lower punch 82 of tightening apparatus 8. Consequently, a multilayer body 9 in which pressure-sensitive sheet 7 was arranged between terminal 2 and annular plate 6 was arranged on the end surface of lower punch 82. Pressure-sensitive sheet 7 was "pressure measurement film (Presheet) for medium pressure MS PS" manufactured by Fujifilm Corporation. Asperity portion 25 of terminal 2 faced pressure-sensitive sheet 7.

Upper punch 81 was compressed by a crosshead of a universal testing machine and moved downward to apply a pressure to multilayer body 9 as simulating a state in which axial force was applied to bolt 4. A finally reached value L1 of pressurization force was $138\times(D2)^2\pm50$ N. Pressurization force was measured by a load cell of the universal testing machine and managed by displacement of the crosshead. Finally reached value L1 was uniquely determined in accordance with inner diameter D1 of through hole 2*h*, although there was a slight error. Five seconds after start of application of axial force, finally reached value L1 was reached. Tightening at finally reached value L1 was maintained for five seconds and thereafter removed. A temperature during measurement was set to 25° C. and a relative humidity was set to 40%.

Pressure-sensitive sheet 7 was collected from between terminal 2 and the annular plate, and an area of a specific color exhibiting region of pressure-sensitive sheet 7 was calculated by image analysis. An area of the specific color exhibiting region was adopted as first area S1.

A color developing surface of pressure-sensitive sheet 7 was scanned. At this time, a color chart annexed to pressure-sensitive sheet 7 was scanned simultaneously with the pressure-sensitive sheet. The color chart shows correspondence between a pressure applied to pressure-sensitive sheet 7 and a density of a color of pressure-sensitive sheet 7. A resolution of a scanner was set to 300 dots per inch (dpi) and 24-bit color.

Image data resulting from scanning was subjected to image analysis by Image J. Image J was open-source image analysis software. A version of the software was 1.53 k. Image data was converted to 8-bit monochrome images. With the software, a histogram of brightness of a color developing region of the pressure-sensitive sheet was created and a histogram of brightness of the color chart was created. As a contact pressure was higher in the pressure-sensitive sheet, the denser color was developed. In the monochrome image, as the contact pressure was higher, brightness was lower. Brightness corresponding to the contact pressure equal to or higher than 25 MPa was obtained from the histogram of the color chart. On the other hand, the number N of pixels indicating the contact pressure equal to or higher than 25 MPa was obtained from the histogram of the color developing region in the pressure-sensitive sheet. In the image at 300 dpi, an area per one pixel was 0.007168 $mm^2$. Therefore, first area S1 was calculated as $0.007168\times N$. When first area S1 was obtained, ratio S1/S2 can be obtained by calculation.

<<Thermal Shock Test>>

A test structure body obtained by tightening of terminal 2 of each sample and annular plate 6 with a bolt and a nut was made. The bolt was composed of SNB7 steel and had the Vickers hardness of 360 HV. The nut was composed of SWRCH10R and had the Vickers hardness of 210 HV. Since terminal 2 had inner diameter D1 of 7 mm, nominal diameter D2 of the bolt and nominal diameter D2 of the nut were each 6 mm. Annular plate 6 had the inner diameter of 6 mm and the outer diameter of 18.4 mm. The bolt and the nut were tightened such that finally reached value L1 of axial force attained to approximately 5 kN ($138\times6^2$ N). Relation between torque and axial force was measured in advance with an axial force bolt with a strain gauge, and tightening torque of the test structure body was set based thereon.

The test structure body was subjected to one thousand cycles of thermal shock test. One cycle included a process A of holding for thirty minutes in an atmosphere at 150° C., a process B of cooling of the atmosphere to −40° C. within five minutes from completion of the process A, a process C of holding for thirty minutes in the atmosphere at −40° C. after completion of the process B, and a process D of heating the atmosphere to 150° C. within five minutes from completion of the process C.

After the thermal shock test, the contact resistance of a test piece was measured with a four-terminal method. In the four terminal method, terminal 2 of the sample and annular plate 6 were each clipped with a current supply alligator clip. In addition, terminal 2 of the sample and annular plate 6 were each clipped with a voltage measurement alligator clip. Under a condition of a limit voltage of 12 V, a measurement current at 1 A was applied. The contact resistance was calculated by dividing the measured voltage by the applied current. The unit of the contact resistance was milliohm (mΩ). Table 2 shows a result of calculation of the contact resistance, the Vickers hardness of terminal 2 of the sample, first area S1, and ratio S1/S2.

TABLE 2

| No. | Vickers Hardness (HV) | First Area S1 ($mm^2$) | Ratio S1/S2 | Contact Resistance (mΩ) |
|---|---|---|---|---|
| 1 | 100 | 64 | 0.67 | 0.09 |
| 2 | 100 | 40 | 0.43 | 0.00 |
| 3 | 100 | 35 | 0.37 | 0.01 |
| 4 | 100 | 25 | 0.26 | 0.06 |
| 5 | 100 | 20 | 0.22 | 0.00 |
| 6 | 100 | 15 | 0.16 | 0.03 |
| 101 | 100 | 83 | 0.88 | 0.31 |
| 102 | 100 | 90 | 0.96 | 1.07 |
| 103 | 71 | 26 | 0.27 | 1.60 |

As shown in Table 2, the contact resistance of the test piece of each of sample No. 1 to sample No. 6 having first area S1 equal to or larger than 5 $mm^2$ and ratio S1/S2 equal to or lower than 0.8 was equal to or lower than 0.1 mΩ. The contact resistance of sample No. 101 and sample No. 102 having ratio S1/S2 higher than 0.8 was equal to or higher than 0.3 mΩ. It was found based on comparison between sample No. 101 and sample No. 102 that the contact resistance was higher as ratio S1/S2 was higher.

The test piece of sample No. 103 had first area S1 equal to or larger than 5 $mm^2$ and S1/S2 equal to or lower than 0.8, whereas the contact resistance of the test piece of sample No. 103 was 1.60 mΩ. The reason for this is estimated as follows. Since terminal 2 provided in the test piece of sample No. 103 had the Vickers hardness of 71 HV, corner 25*c* of asperity portion 25 was deformed in the thermal shock test. It is assumed that, with deformation of corner 25*c*, the fresh surface of aluminum was formed between terminal 2 and annular plate 6 and oxidized. In addition, it is assumed that, at the same time, stress in terminal 2 was relaxed, bolt axial force was lost, terminal 2 and annular plate 6 rubbed against each other, and thus the fresh surface of aluminum was formed and oxidized.

Second Test Example

In a second test example, a plurality of test structure bodies different in Vickers hardness of terminal 2, geometry of asperity portion 25 of terminal 2, or Vickers hardness of attachment target 3 were made and the contact resistance of the test structure bodies was measured. The contact resistance was obtained in the measurement method described in connection with the thermal shock test in the first test example.

Table 3 shows a composition of each test structure body. Terminal 2 having the Vickers hardness of 100 HV was composed of 6056 defined under the international alloy designation system. Terminal 2 having the Vickers hardness of 101 HV was composed of 6061 defined under the international alloy designation system. Terminal 2 having the Vickers hardness of 90 HV was composed of 6061 defined under the international alloy designation system. Terminal 2 having the Vickers hardness of 108 HV was composed of 6061 defined under the international alloy designation system. Terminal 2 having the Vickers hardness of 96 HV was composed of 6061 defined under the international alloy designation system.

Attachment targets 3 were all composed of copper or the copper alloy. Attachment target 3 having the Vickers hardness of 78 HV was composed of C1100-1/4H defined under JIS H 3100:2018. Attachment target 3 having the Vickers hardness of 95 HV was composed of C1020-1/2H defined under JIS H 3100:2018. Attachment target 3 having the Vickers hardness of 130 HV was composed of C2801-1/2H defined under JIS H 3100:2018. C2801-1/2H represents brass.

A hardness ratio in Table 3 is expressed as a value calculated by dividing the Vickers hardness of terminal 2 by the Vickers hardness of attachment target 3. When the Vickers hardness of terminal 2 was equal to or higher than the Vickers hardness of attachment target 3, the hardness ratio was equal to or higher than one.

"Geometry" in Table 3 represents the overall geometry of asperity portion 25. "Crossing grooves" refers to asperity portion 25 in a form of quadrangular knurls composed of a plurality of grooves 25*g* orthogonal to one another. "Parallel grooves" refers to asperity portion 25 in a form of a plurality of grooves 25*g* in parallel. In the present example, variation in ratio S1/S2 originating from the geometry of asperity portion 25 of terminal 2 was measured. Ratio S1/S2 was calculated in the measurement method described in connection with the tightening test in the first test example. Each annular plate 6 tightened together with terminal 2 in the tightening test was composed of C1100-1/4H having the Vickers hardness of 78 HV.

"Width W1" in Table 3 refers to width W1 of the projection shown in FIG. 4. Width W1 being zero means that the projection was pointed as shown in FIG. 5. "Width W2" in Table 3 refers to width W2 of groove 25*g* shown in FIGS. 4 and 5. "Height h1" in Table 3 refers to the height of the projection shown in FIGS. 4 and 5, that is, the depth of groove 25*g*. "Angle φ" in Table 3 refers to angle φ shown in FIG. 5. Sample No. 14 is a sample without asperity portion 25.

TABLE 3

| No. | Vickers Hardness HV of Terminal | Vickers Hardness HV of Attachment Target | Hardness Ratio | Asperity Portion: Geometry | Asperity Portion: Width W1 mm | Asperity Portion: Width W2 mm | Asperity Portion: Height h1 mm | Asperity Portion: Angle φ° | S1 Contact Area $mm^2$ | S1/S2 | Contact Resistance (mΩ) |
|---|---|---|---|---|---|---|---|---|---|---|---|
| 10 | 100 | 78 | 1.28 | Crossing Grooves | 0.00 | 0.80 | 0.40 | 90 | 7 | 0.07 | 0.12 |
| 11 | 101 | 95 | 1.06 | Parallel Grooves | 0.00 | 1.00 | 0.18 | 140 | 36 | 0.35 | 0.00 |
| 12 | 101 | 95 | 1.06 | Crossing Grooves | 0.00 | 1.00 | 0.18 | 140 | 30 | 0.29 | 0.00 |
| 13 | 101 | 95 | 1.06 | Crossing Grooves | 0.00 | 1.00 | 0.18 | 140 | 27 | 0.25 | 0.00 |
| 14 | 90 | 95 | 0.95 | | — | — | — | — | 89 | 0.79 | 1.10 |
| 15 | 108 | 130 | 0.83 | Parallel Grooves | 0.00 | 1.00 | 0.18 | 140 | 33 | 0.31 | 0.03 |
| 16 | 108 | 130 | 0.83 | Crossing Grooves | 0.00 | 1.00 | 0.18 | 140 | 23 | 0.22 | 0.05 |
| 17 | 108 | 130 | 0.83 | Crossing Grooves | 0.00 | 1.00 | 0.18 | 140 | 24 | 0.23 | 0.01 |
| 18 | 96 | 130 | 0.74 | Crossing Grooves | 0.00 | 1.00 | 0.18 | 140 | 23 | 0.22 | 0.12 |
| 19 | 96 | 130 | 0.74 | Crossing Grooves | 0.00 | 1.00 | 0.18 | 140 | 24 | 0.23 | 0.05 |

Sample No. 13 having ratio S1/S2 of 0.25 was lower in contact resistance than sample No. 10 having ratio S1/S2 of 0.07. It was thus found that the contact resistance tended to be low when ratio S1/S2 was equal to or higher than 0.1.

Sample No. 11 to sample No. 13 having the hardness ratio not lower than 1 and not higher than 1.25 were lower in contact resistance than sample No. 10 having the hardness ratio of 1.28 and sample No. 15 to sample No. 19 having the hardness ratio lower than 1. It was thus found that the contact resistance tended to be low when the hardness ratio was not lower than 1 and not higher than 1.25.

It was found based on comparison of sample No. 10 with sample No. 11 to sample No. 13 that the contact resistance tended to be low when angle ϕ was larger than 90°.

REFERENCE SIGNS LIST

1 connection structure
10 terminal-equipped electric wire
2 terminal
  **2*h*** through hole
  21 first surface
  22 second surface
  25 asperity portion
  **25*c*** corner
  **25*g*** groove
  29 wire barrel
3 attachment target
  **3*h*** through hole
  31 coating layer
4 bolt
  **4*n*** nut
  40 shaft portion
  41 head portion
  42 flange portion
5 electric wire
  50 conductor
  51 insulation coating
6 annular plate
7 pressure-sensitive sheet
8 tightening apparatus
  81 upper punch
  82 lower punch
  83 positioning pin
9 multilayer body
D1 inner diameter of through hole
D2 nominal diameter
D3 flange diameter
D4 outer diameter of annular region
P1 pitch
W1, W2 width
h1 height
θ, ϕ angle

The invention claimed is:

1. A connection structure comprising:
a terminal;
an attachment target; and
a bolt connecting the terminal and the attachment target, the terminal including
a first surface that faces the attachment target while the first surface is connected to the attachment target, and
a through hole through which the bolt passes, wherein
the first surface is provided with an asperity portion formed around the through hole,
a material for the terminal is aluminum or an aluminum alloy,
the terminal has a Vickers hardness equal to or higher than 80 HV,
a material for the attachment target is copper or a copper alloy that is different from the material of the terminal,
a ratio S1/S2 between a first area S1 and a second area S2 while the first surface and the attachment target are connected to each other by tightening of the bolt is equal to or lower than 0.8,
the first area S1 is an area of a region where the first surface is in contact with the attachment target at a pressure equal to or higher than 25 MPa,
the second area S2 is an area of an annular region having an inner diameter defined by a nominal diameter D2 of the bolt determined based on an inner diameter D1 of the through hole and an outer diameter defined by a flange diameter D3 of the bolt, and
the first area S1 is equal to or larger than 5 $mm^2$.

2. The connection structure according to claim 1, wherein
the first area S1 is an area of a specific color exhibiting region of a pressure-sensitive sheet obtained in a tightening test that satisfies conditions below,
in the tightening test, a multilayer body in which the pressure-sensitive sheet is arranged between the first surface and a tough pitch copper plate is tightened with axial force of $138\times(D2)^2\pm50$ N,
the tough pitch copper plate is an annular plate having a thickness of 1.5 mm and a Vickers hardness of 78±5 HV,
the annular plate has an inner diameter defined by the nominal diameter D2,
the annular plate has an outer diameter √2 times as large as the flange diameter D3, and
the specific color exhibiting region is a region in a color indicating pressing at the pressure equal to or higher than 25 MPa.

3. The connection structure according to claim 1, wherein the ratio S1/S2 is equal to or lower than 0.5.

4. The connection structure according to claim 1, wherein the ratio S1/S2 is equal to or higher than 0.1.

5. The connection structure according to a claim 1, wherein the aluminum alloy contains at least 0.01 mass % and at most 1.50 mass % of silicon and at least 0.01 mass % and at most 2.00 mass % of magnesium.

6. The connection structure according to claim 1, wherein the terminal has a conductivity not lower than 40% IACS and not higher than 63% IACS.

7. The connection structure according to claim 1, wherein the terminal has the Vickers hardness equal to or lower than 160 HV.

8. The connection structure according to claim 1, wherein in at least a part of the first surface, the aluminum or the aluminum alloy is exposed to outside.

9. The connection structure according to claim 1, wherein a hardness ratio calculated by dividing the Vickers hardness of the terminal by the Vickers hardness of the attachment target is not lower than 1 and not higher than 1.25.

10. The connection structure according to of claim 1, wherein the asperity portion is provided with a plurality of grooves, and the plurality of grooves are each a V groove.

11. The connection structure according to claim 10, wherein an angle formed between sidewalls of two adjacent V grooves among the plurality of grooves is larger than 90° and equal to or smaller than 140°.

12. The connection structure according to claim 1, wherein the terminal is connected to an electric wire in a terminal-equipped electric wire.

13. The connection structure according to claim 1, wherein a surface of the attachment target is further provided with a coating layer.

14. The connection structure according to claim 13, wherein the coating layer contains at least one selected from gold, silver, tin, and nickel.

15. The connection structure according to claim 1, wherein the ratio S1/S2 is equal to or lower than 0.4, a material for the terminal is 6061 or 6056 defined under international alloy designation system, the terminal has a conductivity not lower than 40% IACS and not higher than 50% IACS, the terminal has the Vickers hardness not lower than 90 HV and not higher than 110 HV, a material for the bolt is SNB7 steel defined under JIS G 4107, the bolt has the nominal diameter D2 of 6 mm, the bolt has the flange diameter D3 of 13 mm, a material for the attachment target is copper, and a surface of the attachment target is further provided with a coating layer.

* * * * *